(12) United States Patent
Cho et al.

(10) Patent No.: US 9,967,914 B2
(45) Date of Patent: May 8, 2018

(54) METHOD OF PROCESSING SIGNALING OF TERMINALS OF SUBSCRIBERS IN A MOBILE COMMUNICATION SYSTEM

(75) Inventors: Song Yean Cho, Seoul (KR); Sang Bum Kim, Suwon-si (KR); Sang Soo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 14/128,776

(22) PCT Filed: Jul. 2, 2012

(86) PCT No.: PCT/KR2012/005243
§ 371 (c)(1),
(2), (4) Date: Dec. 23, 2013

(87) PCT Pub. No.: WO2013/002618
PCT Pub. Date: Jan. 3, 2013

(65) Prior Publication Data
US 2014/0126458 A1    May 8, 2014

(30) Foreign Application Priority Data
Jun. 30, 2011  (KR) .................. 10-2011-0064297

(51) Int. Cl.
*H04H 20/71* (2008.01)
*H04W 76/04* (2009.01)
(Continued)

(52) U.S. Cl.
CPC .......... *H04W 76/04* (2013.01); *H04L 12/189* (2013.01); *H04W 8/186* (2013.01); *H04W 8/06* (2013.01)

(58) Field of Classification Search
CPC ....... H04W 8/06; H04W 76/04; H04W 8/186; H04W 4/005; H04W 68/00; H04W 4/00; H04W 4/08; H04W 68/02; H04L 12/189
See application file for complete search history.

(56) References Cited

U.S. PATENT DOCUMENTS

2010/0056175 A1\* 3/2010 Bachmann ............. H04W 8/08
455/456.1
2010/0113045 A1\* 5/2010 Iwamura ............. H04W 76/048
455/450

(Continued)

FOREIGN PATENT DOCUMENTS

KR    10-2004-0094661 A    11/2004
KR    10-2005-0010980 A    1/2005
(Continued)

OTHER PUBLICATIONS

3GPP TS 24.301 V8.1.0 (Mar. 2009).\*
(Continued)

*Primary Examiner* — Yemane Mesfin
*Assistant Examiner* — Abdelillah Elmejjarmi
(74) *Attorney, Agent, or Firm* — Jefferson IP Law, LLP

(57) ABSTRACT

The present invention relates to a method and a device that control signals for a plurality of terminals possessed by the same user. More particularly, a method of controlling signals for a plurality of terminals using a mobility management entity (MME) according to an embodiment of the present invention is characterized by including the steps of: setting terminals with the same subscriber codes and the same mobility as grouping terminals; and transmitting group signals on the grouping terminals to a base station. According to the present invention, the following advantages are realized: of enabling the prevention of waste in having to report mobility-related information on each terminal and (Continued)

being able to simultaneously transmit grouping or other signals to all terminals that are in a group in a network.

8 Claims, 6 Drawing Sheets

(51) Int. Cl.
*H04L 12/18* (2006.01)
*H04W 8/18* (2009.01)
*H04W 8/06* (2009.01)

(56) References Cited

U.S. PATENT DOCUMENTS

2011/0053619 A1* 3/2011 Shaheen et al. .............. 455/466
2014/0038647 A1* 2/2014 Zhang ................... H04W 68/02
455/458

FOREIGN PATENT DOCUMENTS

KR 10-2011-0050186 A 5/2011
WO WO2011116849 A1 * 9/2011 ............ H04W 74/08

OTHER PUBLICATIONS

3GPP; 3rd Generation Partnership Project; Technical Specification Group Radio Access Network; Evolved Universal Terrestrial Radio Access (E-UTRA); Medium Access Control (MAC) protocol specification (Release 10); 3GPP TS 36.321 V10.2.0; Jun. 23, 2011; Valbonne, France.

* cited by examiner

METHOD OF PROCESSING SIGNALING OF TERMINALS OF SUBSCRIBERS IN A MOBILE COMMUNICATION SYSTEM

TECHNICAL FIELD

The present invention relates to a signal processing method of a user terminal in a mobile communication system and, in particular, to a method for processing signals concerning a plurality terminals owned by a user.

BACKGROUND ART

With the advent of various portable devices, it is not rare for a person to own multiple portable devices. Many portable devices have the communication function to update information in real time.

For example, a user may carry multiple cellular communication-enabled devices such as mobile phone, electronic book (ebook), multimedia player, and tablet Personal Computer (PC). For another example, a vehicle may be equipped with various process modules supporting cellular communication on the move. The process modules may include a cellular communication-enabled black box, a cellular communication-enabled navigator, and a cellular communication-based emergency call device.

In such a case that a user owns multiple portable devices, it is likely for the user (including transport means such as vehicle) to use the portable devices for communication simultaneously. At this time, the mobility levels measured by the portable devices carried by a single user are identical among each other. However, if the communication service is provided based on the mobility levels measured by the respective devices without consideration of the equal mobility of the devices, this may cause problem.

DISCLOSURE OF INVENTION

Technical Problem

The present invention aims to provide a signal processing method that is capable of processing signals in consideration of the equal mobility of a plurality of terminals carried by one subscriber.

Also, the present invention aims to provide a signal processing method and apparatus that is capable of grouping the terminals carried by the same subscriber. Also, the present invention aims to provide a signal processing method and apparatus that is capable of allowing the terminals grouped by mobility to receive and transmit control signals simultaneously with the configuration of a leader terminal.

Solution to Problem

The present invention aims to solve the above problems. In more detail, the signal control method according to an embodiment of the present invention includes sorting terminals having same mobility into a group, configuring a group reception period for simultaneous reception of control signal at the grouped terminals, and transmitting a group signal in order for the grouped terminals to receive the signal addressed to the leader terminal.

The method for configuring the reader terminal includes checking, when attach request is received from a terminal, other terminals linked to the corresponding terminal, registering, when no currently linked terminal exists, the corresponding terminal as the leader terminal, and setting a group ID, Tracking Area Update (TAU) period, and individual and group Discontinuous Reception (DRX) cycle.

The method includes regarding, when currently linked terminals exist, the terminal transmitted the attach request as non-leader terminal and transmitting the TAU period and group DRX cycle to the corresponding terminal. At this time, the non-leader terminals compute a period for checking the group paging based on the received group ID and group DRX.

The systems transmits, when a TAU request message is received, the group paging information including special information, receives the group paging information, performs, when it is checked that the leader terminal has not request for TAU based on the special information, the signal individual and, otherwise, in group signal processing manner.

A signal control method for multiple terminal owned by a user in a mobile communication system according to an embodiment of the present invention includes checking, when a terminal requested for attachment among the terminals, whether the terminal is the terminal requesting first for attachment among the terminals, configuring, when the terminal is the first terminal requested for attachment, the terminal as the leader terminal and setting Group ID, Tracking Area Update (TAU) period, individual and group Discontinuous Reception (DRX) periods, transmitting, when the terminal is not the first terminal requested for attachment, the group ID and group DRX cycle configured by the leader terminal to the corresponding terminal, computing and configuring, at the terminal received the information, a group paging period based on the received group ID and group DRX cycle, generating, when TAU request is received, group paging information to be transmitted to the non-leader terminal with Group IP, and transmitting the group paging information to the terminal at group DRX cycle.

Advantageous Effects of Invention

The signal processing method and apparatus of the present invention is advantageous to reduce the mobility information report overhead by grouping the terminals in the same mobility situation.

The signal processing method and apparatus of the present invention is advantageous to reduce the control signal overhead in such a way of selecting one of the grouped terminals as a leader terminal to report mobility information to the network as a representative for the group. Since the mobility levels of the grouped terminals are managed based on the mobility information reported by the representative terminal, it is possible to reduce the mobility report signal overhead and transmit the control signal such as paging to the grouped terminals simultaneously.

MODE FOR THE INVENTION

Exemplary embodiments of the present invention are described with reference to the accompanying drawings in detail. The same reference numbers are used throughout the drawings to refer to the same or like parts.

Figure 1:
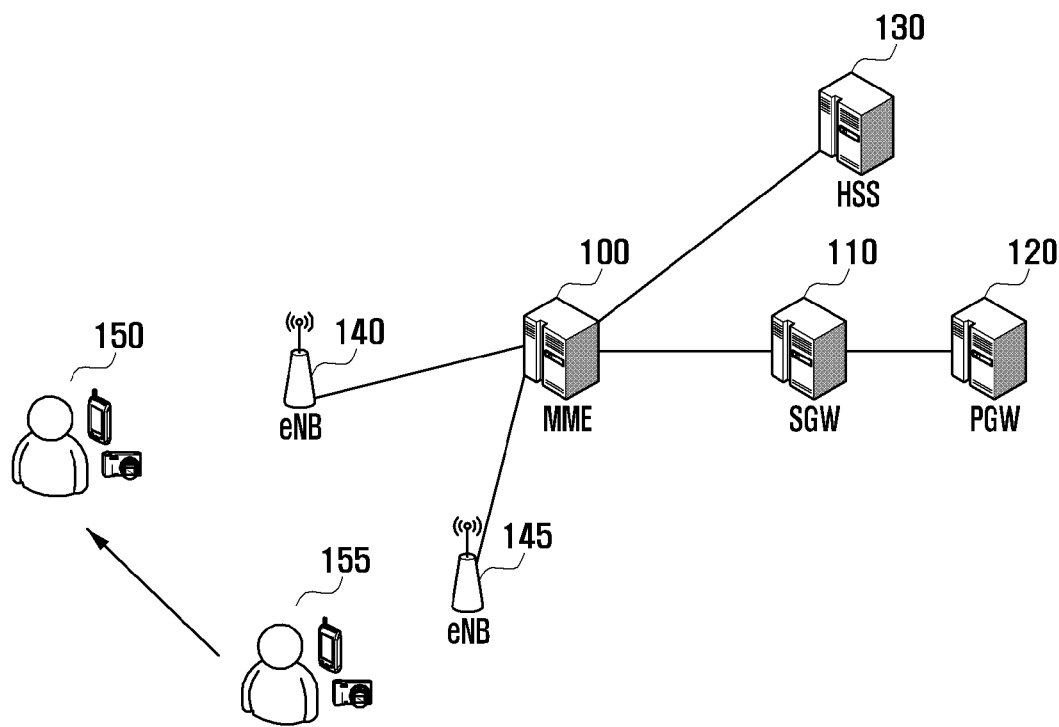
FIG. 1 is a diagram illustrating a situation where a user carrying a plurality of mobile terminals roams in a mobile communication system.
Figure 2:
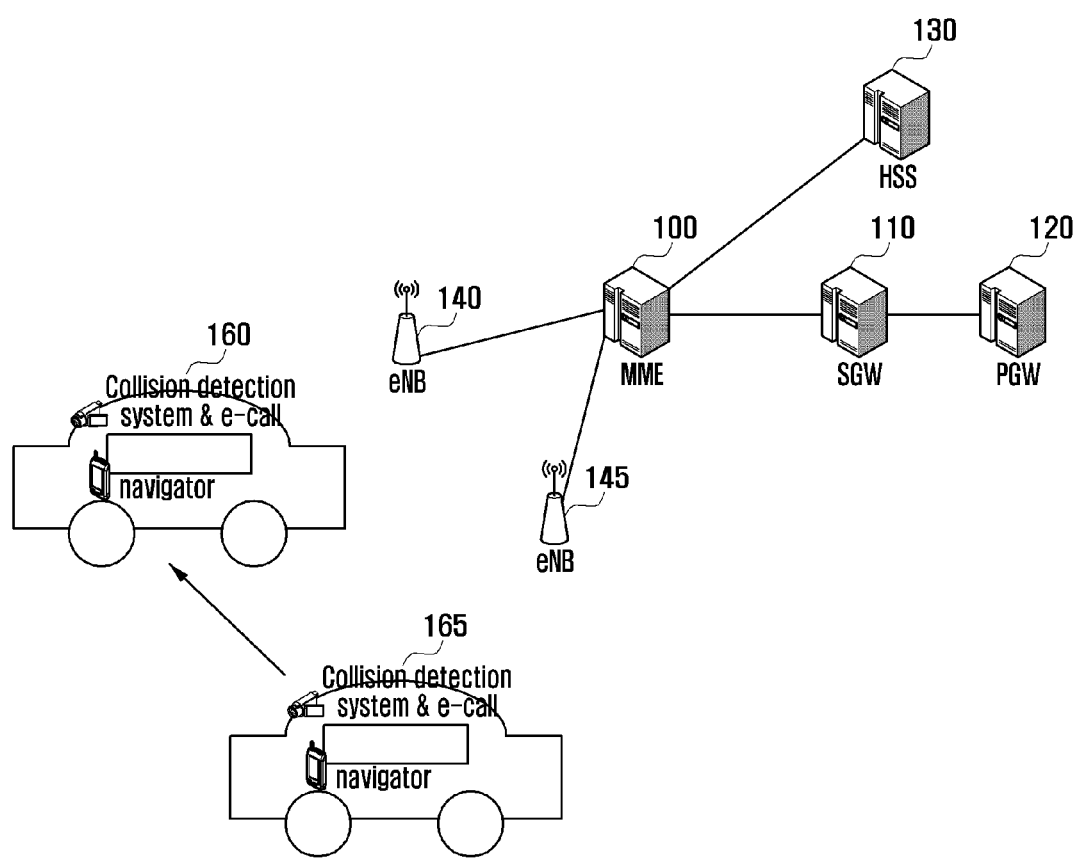
FIG. 2 is a diagram illustrating a situation where a vehicle equipped with a plurality of communication module roams in a mobile communication system.

FIG. 1 is a diagram illustrating a situation where a user carrying a plurality of mobile terminals roams in a mobile communication system, and FIG. 2 is a diagram illustrating a situation where a vehicle equipped with a plurality of communication module roams in a mobile communication system.

Referring to FIGS. 1 and 2, the Mobility Management Entity (MME) 100 manages the User Equipment (UE) in idle mode and selects Packet Data Network (PDN) gateway and serving gateway. The MME 100 is also responsible for roaming and authentication functions and processes bearer signal generated by the UE.

The Serving Gateway (SGW) 110 serves as a mobility anchor in handover between evolved Node Bs (eNBs). The PDN Gateway (PGW) 120 allocates IP addresses to the UEs, performs packet data-related function of the core network, and serves as a mobility anchor for interworking between 3GPP radio network and non-3GPP radio network.

The PGW 120 also determines bearer bandwidth provided to the subscriber and is responsible for packet data forwarding and routing function. The Home Subscriber Server (HSS) 130 is a system for managing subscriber information (location information, authentication information, service information, etc.) such as database system managing subscriber information and service information for all networks.

The evolved Node B (eNB) 140 and 145 is a base station apparatus responsible for radio communication with the UEs located within the cell coverage region. Although the description is directed to the case where the base station apparatus is eNB, the eNB may be substituted by other type of base station apparatus depending on the mobile communication system.

The users 150 and 155 (or vehicles 160 and 165) carry a plurality of terminals and may be identical with or different from each other. That is, if the user 155 or vehicle 165 performs handover from the eNB 145 to the eNB 140, the user 155 (or vehicle 165) is identical with the user 150 (or vehicle 160). In the following, the description is made with the user 150.

As shown in FIGS. 1 and 2, when the user carries a plurality of terminals, the terminals owned by the same user are grouped and configured to receive the control signals simultaneously. The system transmits a signal to a group leader terminal such that all of the grouped terminals receive the signal.

Figure 3:
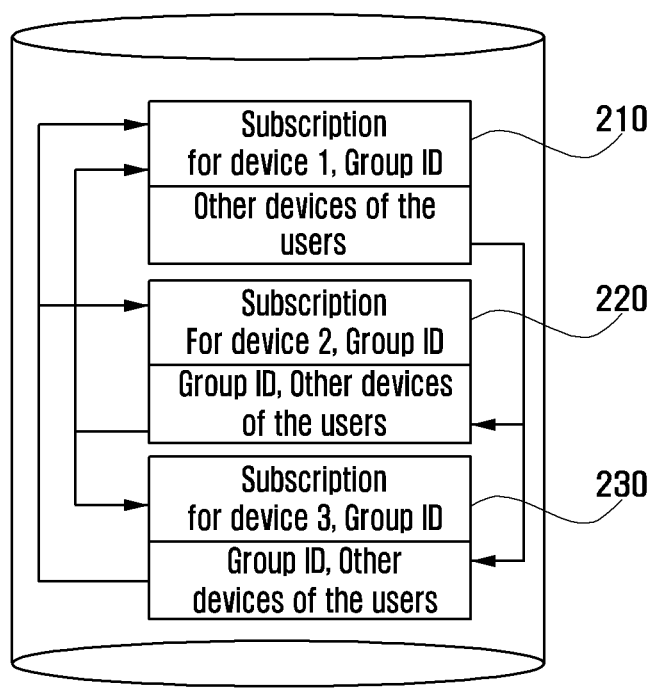
FIG. 3 is a diagram illustrating a structure of the information on the UEs grouped by user according to an embodiment of the present invention.

FIG. 3 is a diagram illustrating a structure of the information on the UEs grouped by user according to an embodiment of the present invention. FIG. 3 shows an exemplary case where a user uses three UEs.

Referring to FIG. 3, the UEs 210, 220 and 230 have the respective subscription information and group ID. As shown in FIG. 3, the subscription informations of the UEs of the same user have the same group ID and stored in link with the subscription informations of other UEs in the HSS 130.

If the simultaneous movement of the UEs grouped as shown in FIG. 3 is detected, the MME 100 grants the first-accessed UE the right to lead the group. The representative UE having the right to lead the group reports mobility information to the network.

Since the UEs belonging to the group are managed based on the same mobility information reported by the representative UE, it is possible to avoid unnecessary mobility information reporting overhead. The network is also capable of transmitting a signal such as paging signal to the terminals grouped the user in the network.

In order to accomplish this, the signal processing method according to an embodiment of the present invention consists of a grouping procedure and a group-specific signaling control procedure.

The grouping procedure is capable of selecting a group leader and providing the other group members with the information for use in receiving the signal addressed to the group leader.

The signaling control procedure is capable of allowing the group leader to transmit control signal to the network while allowing other UEs to receive the response signal without transmission of the control signal. At this time, the group is valid within the cell where it has been formed and, if the user moves to another cell, it is necessary to perform the grouping procedure again.

Descriptions are made of the grouping procedure and group-specific signaling control procedure according to an embodiment of the present invention hereinafter in detail.

The grouping procedure may be triggered when one of the UEs owned by a user performs Attach/Tracking Area Update (TAU) and when other UEs perform Attach/TAU after the Attach/TAU of the first UE.

Figure 4:
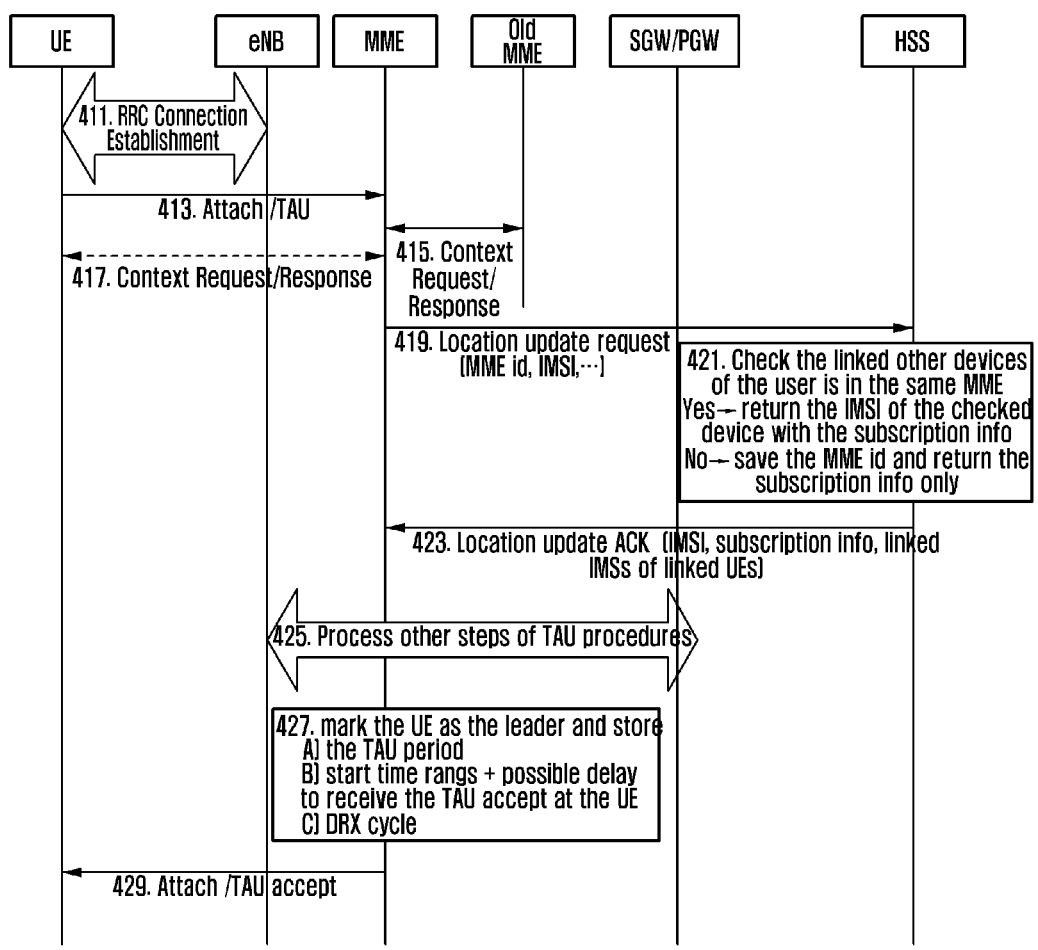
FIG. 4 is a signal flow diagram illustrating the grouping procedure when one of the UEs owned by the user performs Attach/TAU according to an embodiment of the present invention.

First, a description is made of the grouping procedure when one of the UEs owned by the user performs Attach/TAU. FIG. 4 is a signal flow diagram illustrating the grouping procedure when one of the UEs owned by the user performs Attach/TAU according to an embodiment of the present invention.

Referring to FIG. 4, the UE establishes a Radio Resource Control (RRC) connection with an eNB at step 411 and sends the MME an Attach/TAU Request message at step 413. At this time, the MME which has received the Attach/TAU Request message may have no context of the corresponding UE and thus it exchanges Context Request/Response messages with the old MME to check the UE context and acquire International Mobile Subscriber Identity (IMSI) at step 415 or exchanges Identity Request/Response message with the UE to acquire the IMSI of the UE at step 417.

Once the IMSI of the UE has been acquired, the MME sends the HSS a Location Update Request message including the IMSI of the UE and MME ID at step 419. Upon receipt of the Location Update Request message, the HSS records the UE which has sent the Attach/TAU Request message as the UE registered with the MME at step 421.

That is, the HSS checks whether any other UE of the user is linked to the same MME and, if so, returns the IMSIs of the checked UE with the subscription information and, otherwise, saves the MME ID and returns the subscription information only.

Afterward, the HSS sends the MME a Location Update ACK including IMSIs of the other UEs of the user, subscription information, and linked IMSs of the linked UEs) at step 423.

At this time, the HSS performs first filtering to filter the UEs registered with the MME which have transmitted the location update request message among the UEs linked as the UEs owned by the same user.

Afterward, the eNB, MME, SGW, and PGW process other steps of TAU procedure at step 425.

The MME checks whether the other UEs of the user that are informed by the HSS are currently under its management at step 427. If no information on other UEs of the user is received from the HSS or if there is no other UE owned by the user, the MME marks the corresponding UE as the leader UE.

Next, the MME stores the group ID allocated to the UE, TAU period, per-UE DRX cycle, and group DRX cycle (the TAU period, start time range+possible delay to receive the TAU accept at the UE, DRX cycle). Here, the per-UE DRX cycle and the group DRX cycle may be identical with each other.

Next, the MME sends the UE an Attach/TAU accept message at step 429 and, upon receipt of this message, the UE processes the control signal such as periodic TAU request in the conventional manner.

Figure 5:
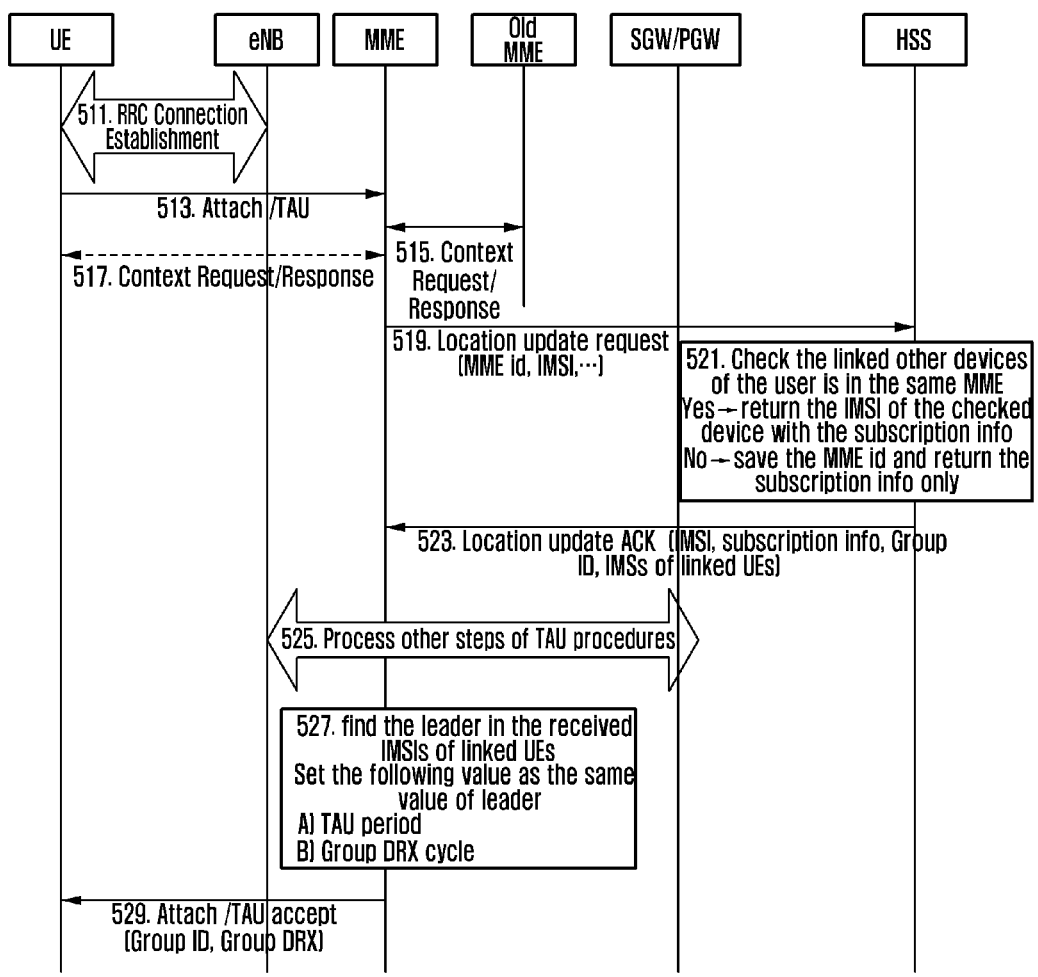
FIG. 5 is a signal flow diagram illustrating the Attach/TAU procedure of other UE of the user after the Attach/TAU of the first UE among the UEs owned by the user according to an embodiment of the present invention.

Second, a description is made of the Attach/TAU procedure of other UEs after the Attach/TAU procedure of the first UE of the user. FIG. 5 is a signal flow diagram illustrating the Attach/TAU procedure of other UE of the user after the Attach/TAU of the first UE among the UEs owned by the user according to an embodiment of the present invention.

Steps 511 to 525 of FIG. 5 are identical with steps 411 to 525 of FIG. 4.

After performing the TAU procedure at step 525, the MME checks whether the other UEs of the user which that are informed by the HSS are the UEs under its management at step 527.

At this time, if no information on other UEs of the user is received from the HSS or if there is no other UE owned by the user, the MME marks the corresponding UE as the leader UE and stores the group ID allocated to the UE, TAU period, per-UE DRX cycle, and group DRX cycle at step 527 (see step 427 of FIG. 4).

Otherwise, if there is any other UE owned by the user under the management of the MME, this means that there is another UE marked as the leader UE and thus the MME retrieves the group ID from the leader information and determines whether the group IDs are identical with each other at step 527.

If the group IDs are identical with each other, the MME stores the TAU period and Group DRX cycle as the TAU period and Group cycle of the leader UE (find the leader in the received IMSIs of the linked UEs. Set the TAU period and Group DRX cycle value as the same value of leader).

Afterward, the MME sends the UE an Attach/TAU accept message including the configured Group ID and group DRX cycle at step 529 and, upon receipt of the is message, the UE computes paging frame and paging occasion for receiving the paging message based on the Group ID and group DRX cycle to check the group paging as well as per-UE paging.

Figure 6:
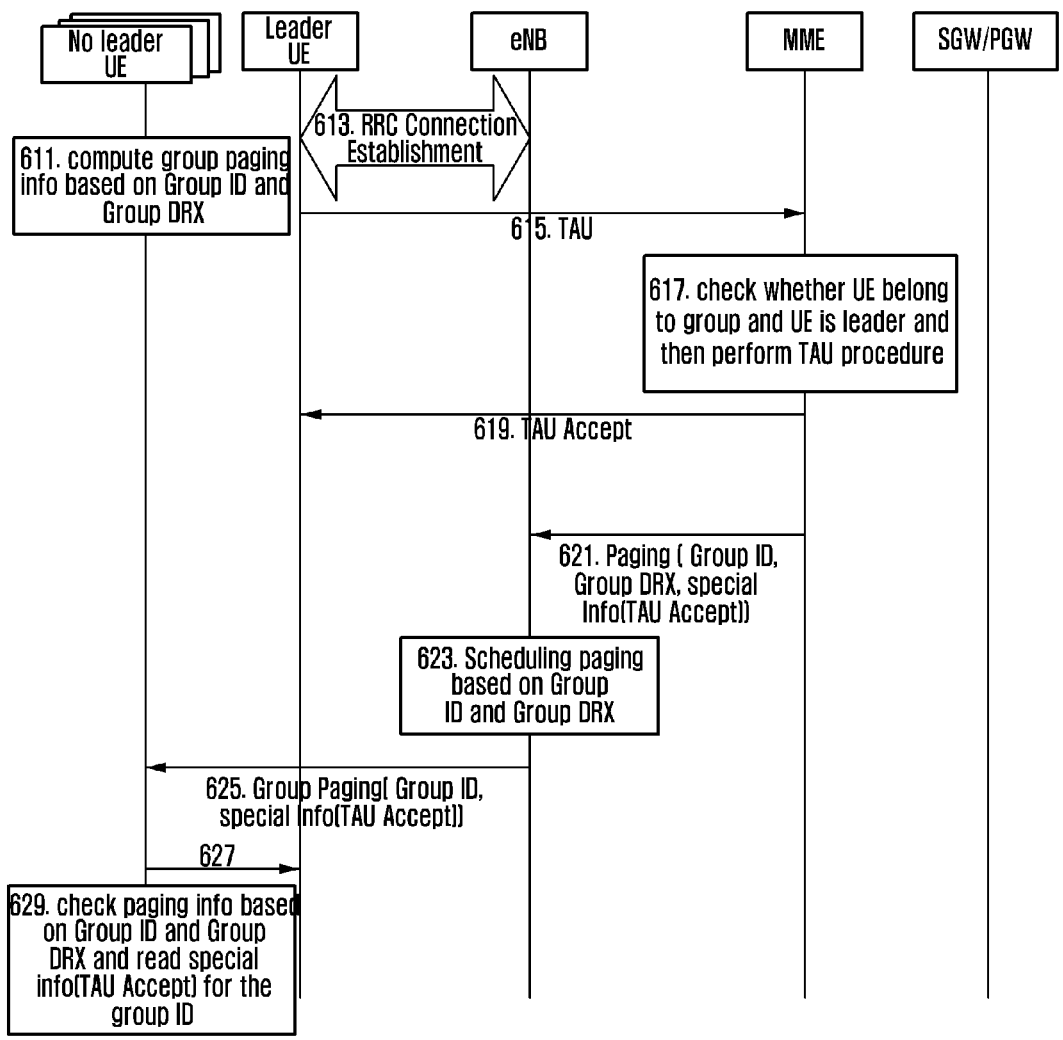
FIG. 6 is a signal flow diagram illustrating a procedure of sharing the response signal received in replay to the control signal of the leader UE among grouped UEs according to an embodiment of the present invention.

In the case that the user uses multiple UEs, the UEs of the user are grouped through the procedure of FIG. 4 or 5. A description is made of the signaling control procedure of grouped UEs hereinafter. FIG. 6 is a signal flow diagram illustrating a procedure of sharing the response signal received in replay to the control signal of the leader UE among grouped UEs according to an embodiment of the present invention.

The reader UE performs TAU and receives TAU accept message periodically. The non-leader UEs stop transmitting the TAU request since the receipt of the TAU accept message including Group ID and Group DRX.

That is, each non-leader UE computes the group paging check cycle based on the group ID and group DRX and checks the paging frame and paging occasion to receive only the message carrying special information.

The MME processes the TAU request transmitted by the leader UE periodically and then requests the eNB processed the TAU of the leader UE to perform group paging based on the group ID and group DRX.

Referring to FIG. 6, the non-leader UE computes the group paging cycle based on the group ID and group DRX at step 611. The leader UE establishes an RRC connection with the eNB at step 613 and computes the group paging occasion based on the group ID and group DRX in the TAU accept message to monitor Physical Downlink Control Channel (PDCCH).

The UE which has not received the group ID and group DRX in the TAU accept message perform conventional periodic TAU procedure at step 615.

If the TAU request message is received, the MME verifies that the UE which has performed TAU belongs to the group and determines whether the UE is the leader UE at step 617 and, if the UE is the leader UE, sends the UE a TAU accept message at step 619.

Otherwise if the UE is not the leader UE, the MME sends the group paging information based on the group ID and group DRX cycle to the eNB to eNB which has delivered the TAU request message transmitted by the leader UE at step 621.

At this time, the information notifying that the UE has performed the TAU procedure or the TAU accept message is transmitted to the eNB as the special information with the Group ID in the form of the group paging message (including group ID, group DRX, special information (TAU accept)).

If the group paging information is received from the MME, the eNB computes the paging frame and paging occasion using the group DRX and group ID and schedules the paging including the special information based on group ID and group DRX at step 623. If the group paging is received at step 625, the non-leader UEs check that the leader UE has performed the TAU procedure and thus stop doing individual TAU procedure. That is, the group-specific information, with the exception of the TAU accept message, is delivered using the group paging message as special information.

The signaling of the non-leader group members (UEs) is control by the leader UE. The non-leader group members check the paging information based on group ID and group DRX and reads the special information (TAU accept) for the group IP) at step 629.

At this time, if it is determined, based on the group special information, that the leader UE has not performed the TAU procedure or moved from the cell which has allocated the group DRX and group ID to another cell, this is regarded that the UE has left the group and thus the non-leader UEs transmit the control signal (e.g. TAU request message) individually.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method for controlling signals of multiple terminals, by a mobility management entity (MME), in a mobile communication system, the method comprising:
   receiving, from a terminal, a connection request message;
   identifying whether the terminal is firstly connected to the MME among a plurality of terminals including a same subscriber code;
   setting, if the terminal is firstly connected to the MME among the plurality of terminals including the same subscriber code, the terminal as a first terminal of a group;
   setting, if the terminal is not firstly connected to the MME among the plurality of terminals including the same subscriber code, a tracking area update (TAU) period and a group discontinuous reception (DRX) of the terminal to same values of the first terminal;
   classifying the plurality of terminals including the same subscriber code as the group associated with the first terminal; and
   transmitting, to a base station, a group signal including TAU information of the first terminal, a group identifier for the group, and the group DRX cycle associated with the first terminal for the group,
   wherein the group identifier and the group DRX cycle, which is different from a DRX cycle assigned to each of the plurality of terminals, are used to identify paging information for the group.

2. The method of claim 1, wherein the transmitting of the group signal comprises:
   generating a group paging information including the group identifier and the group DRX cycle;
   transmitting the group paging information to the base station.

3. A method for controlling signals concerning multiple terminals, by a base station, in a mobile communication system, the method comprising:
   forwarding an attach request message transmitted by a terminal to a mobility management entity (MME);
   receiving paging information for a group of a plurality of terminals which include a same subscriber code from the MME;
   scheduling a paging message to the group based on the paging information; and
   after the forwarding of the attach request message, transmitting, to the terminal, an access accept message including tracking area update (TAU) information of a first terminal, a group identifier for the group, and a group discontinuous reception (DRX) cycle associated with the first terminal,
   wherein the terminal is set as the first terminal of the group, if the terminal is firstly connected to the MME among the plurality of terminals including the same subscriber code,
   wherein a TAU period and the group DRX of the terminal are set to same values of the first terminal, if the terminal is not firstly connected to the MME among the plurality of terminals including the same subscriber code, and
   wherein the group identifier and the group DRX cycle, which is different from a DRX cycle assigned to each of the plurality of terminals, are used to identify paging information for the group.

4. The method of claim 3, wherein the scheduling of the paging message comprises transmitting the paging information including specific information for the group other than individual terminals.

5. A mobility management entity (MME) for controlling signals of multiple terminals in a mobile communication system, the MME comprising:
   a transceiver configured to transmit and receive signals; and
   a controller coupled to the transceiver and configured to:
      receive a connection request message from a terminal,
      identify whether the terminal is firstly connected to the MME among a plurality of terminals including a same subscriber code,
      set, if the terminal is firstly connected to the MME among the plurality of terminals including the same subscriber code, the terminal as a first terminal of a group,
      set, if the terminal is not firstly connected to the MME among the plurality of terminals including the same subscriber code, a tracking area update (TAU) period and a group discontinuous reception (DRX) of the terminal to same values of the first terminal,
      classify the plurality of terminals including the same subscriber code as the group associated with the first terminal, and
      transmit, to a base station, a group signal including TAU information of the first terminal, a group identifier for the group, and the group DRX cycle associated with the first terminal for the group,
   wherein the group identifier and the group DRX cycle, which is different from a DRX cycle assigned to each of the plurality of terminals, are used to identify paging information for the group.

6. The MME of claim 5, wherein the controller is further configured to generate the group paging information including the group identifier and the group DRX cycle and transmit the group paging information to the base station.

7. A base station for controlling signals concerning multiple terminals in a mobile communication system, the base station comprising:
   a transceiver configured to transmit and receive signals; and
   a controller coupled to the transceiver and configured to:
      forward an attach request message transmitted by a terminal to a mobility management entity (MME),
      receive paging information for a group of a plurality of terminals which include a same subscriber code from the MME,
      schedule a paging message to the group based on the paging information, and
      transmit, to the terminal, an access accept message including tracking area update (TAU) information of a first terminal, a group identifier for the group, and a group discontinuous reception (DRX) cycle associated with the first terminal,
   wherein the terminal is set as the first terminal of the group, if the terminal is firstly connected to the MME among the plurality of terminals including the same subscriber code,
   wherein a TAU period and the group DRX of the terminal are set to same values of the first terminal, if the terminal is not firstly connected to the MME among the plurality of terminals including the same subscriber code, and wherein the group identifier and the group DRX cycle, which is different from a DRX cycle assigned to each of the plurality of terminals, are used to identify paging information for the group.

8. The base station of claim 7, wherein the controller is further configured to transmit the paging information including special information addressed to the group other than individual terminals.

* * * * *